(12) United States Patent
Mok et al.

(10) Patent No.: US 9,276,874 B1
(45) Date of Patent: Mar. 1, 2016

(54) HIGH BANDWIDTH GFP DEMAPPER

(71) Applicant: PMC-Sierra US, Inc., Sunnyvale, CA (US)

(72) Inventors: Winston Ki-Cheong Mok, Vancouver (CA); Jayeshkumar Roonwal, Bangalore (IN); Kishor Ashanand Ruparel, Bangalore (IN)

(73) Assignee: PMC-Sierra US, Inc., Sunnyvale, CA (US)

( * ) Notice: Subject to any disclaimer, the term of this patent is extended or adjusted under 35 U.S.C. 154(b) by 340 days.

(21) Appl. No.: 13/839,961

(22) Filed: Mar. 15, 2013

Related U.S. Application Data

(60) Provisional application No. 61/709,052, filed on Oct. 2, 2012.

(51) Int. Cl.
  *H04J 3/16* (2006.01)
  *H04L 12/931* (2013.01)
  *H04L 12/861* (2013.01)
  *H04L 12/939* (2013.01)

(52) U.S. Cl.
  CPC .............. *H04L 49/00* (2013.01); *H04L 49/552* (2013.01); *H04L 49/90* (2013.01); *H04J 3/16* (2013.01); *H04J 3/1617* (2013.01)

(58) Field of Classification Search
  CPC ........ H04J 3/16; H04J 3/1617; H04L 49/552; H04L 49/90
  See application file for complete search history.

(56) References Cited

U.S. PATENT DOCUMENTS

| 7,570,643 | B2 | 8/2009 | Prasad et al. | |
| 8,325,719 | B1* | 12/2012 | Loprieno et al. | 370/389 |
| 2002/0090007 | A1* | 7/2002 | Kamiya et al. | 370/476 |
| 2008/0232366 | A1* | 9/2008 | He | 370/389 |
| 2009/0161538 | A1* | 6/2009 | McGuire | 370/230 |
| 2009/0323727 | A1* | 12/2009 | Surek | 370/503 |
| 2010/0142560 | A1* | 6/2010 | Sharivker et al. | 370/475 |
| 2010/0309930 | A1* | 12/2010 | Harrison et al. | 370/474 |

OTHER PUBLICATIONS

"Generic Framing Procedure", May 2001, American National Standard for Telecommunications, T1X1.5/2000-024R3, pp. 1-44.*
Gupta et al., "A Novel Approach to GFP Frame Delineation", Sep. 15, 2006, IEEE, India Conference, 2006 Annual IEEE, pp. 1-3.*
Toal et al., "A VLSI GFP frame delineation circuit", Mar. 2, 2006, IEEE Computer Society Annual Symposium on Emerging VLSI Technologies and Architectures, 2006., pp. 1-2.*

(Continued)

*Primary Examiner* — Paul H Masur
(74) *Attorney, Agent, or Firm* — Dennis R. Haszko

(57) ABSTRACT

A system and method of delineating GFP data. The GFP framer comprises a candidate generator for generating an array of core header candidates from a data word received on a data bus, a candidate processor for generating a plurality of candidate tours and a frame delineator for identifying a candidate tour as an active tour and delineating the boundaries of the GFP frames defined by the active tour. Each core header candidate defines a reference position of one of the plurality of candidate tours. Each of the plurality of candidate tour comprises a record of core header positions for a series of GFP frames from the data word.

22 Claims, 13 Drawing Sheets

(56) References Cited

OTHER PUBLICATIONS

Toal et al., "Exploration of GFP Frame Delineation Architectures for Network Processing", IEEE, Sep. 12-15, 2004, pp. 159-162, United Kingdom.

Toal et al., "A 10 GBPS GFP Frame Delineation Circuit with Single Bit Error Correction on an FPGA", IEEE, Jul. 17-25, 2005, pp. 357-362, United Kingdom.

* cited by examiner

HIGH BANDWIDTH GFP DEMAPPER

CROSS REFERENCE TO RELATED APPLICATIONS

This application claims the benefit of priority of U.S. Provisional Patent Application No. 61/709,052 filed Oct. 2, 2012, which is incorporated herein by reference in its entirety.

FIELD

The present disclosure relates generally to the field of data communications.

BACKGROUND

Generic Framing Procedure ("GFP") is an encapsulation technique defined by the International Telecommunication Union standard ITU-T G.7041. GFP provides mapping of traffic from higher-layer packet oriented client signals over a transport network.

In recent years, the bandwidth demand on telecommunications networks has increased dramatically. As a result, 100 Gigabit/second (100 Gbps) class protocols have been defined in IEEE Ethernet and in ITU-T Optical Transport Network. Four hundred Gigabits per second protocols and 1 Terabit per second protocols are expected to be defined in the near future. However, successive generations of CMOS technologies have only been able to reduce feature sizes, allowing for dramatically more gates per unit area, but have not significantly increased the speed of each gate. As the data rate rises according to increasing demand for bandwidth, processing elements must resort to using wider and wider internal data paths to cope with the bandwidth demands.

In a frame-mapped GFP mode, each upper-layer client packet is mapped to a single GFP client frame. A device receiving a stream of GFP data will need to demap the GFP data into the upper-layer packet data. A GFP demapper provides an ingress interface that is a digital constant bit rate (CBR) interface for receiving CBR-type GFP data, and an egress interface that is a digital packet interface for transmitting upper-layer packet data. The following discussion of characteristics of the GFP standard is relevant to the design of a GFP demapper.

In addition to providing GFP client frames, GFP also provides for GFP control frames, which are currently only functionally defined as idle frames. In the remainder of this disclosure, the terms GFP control frame and GFP idle frame will be used interchangeably.

GFP client frames are further divided into GFP client data frames, which carry client data in the payload bytes of the GFP frame, and GFP client management frames, which transport management information in the payload bytes of the GFP frame. Generally, a GFP client frame is comprised of a four-byte core header and a payload area of size ranging from 4 to 65535 bytes. In contrast, a GFP idle frame solely comprises the four-byte core header.

The core header comprises a 16-bit payload length indicator (PLI) field and a 16-bit core header error check (cHEC) field. Therefore, all GFP frames received on a bus include a four-byte core header, which, along with the PLI, can be used to delineate the boundaries of all of the frames. In order to provide a packet-like egress interface, the GFP demapper comprises a GFP framer for delineating the GFP frames received on the CBR-like ingress interface.

Generally, the GFP framer performs GFP frame delineation starting from a HUNT state by parsing an incoming stream of data, byte-by-byte, for a four-byte core header. The framer evaluates the 16-bit cHEC field of the core header, which is a 16-bit CRC code over the 32 bits of the core header. Once a correctly formatted core header is found, the framer looks to the PLI field to determine the expected location of the next core header. The cHEC field of the next core header is then evaluated, and if the core header is correctly formatted, the framer has identified two consecutive core headers. Depending on the application, two consecutive core headers may be enough synchronization for frame delineation. Otherwise, if synchronizing to more consecutive core headers is desired, the framer may repeat the process of determining a next expected core header from the PLI field and evaluating the cHEC field of the next expected core header for as many correctly formatted core headers as required.

If the data stream is incoming on a bus, then the framer performs frame delineation as described above on the data on the bus. However, there may be more than one delineated GFP frame on the bus. In fact, given the four-byte size of GFP idle frames and a data bus of large enough width, there may be a high probability that multiple GFP frames are resident on the data bus at any time. Delineating all of these frames on a bus in a single clock or data cycle becomes increasingly difficult as data paths increase in width.

In order to provide a packet-like egress interface, the GFP demapper also comprises a GFP frame unpacker because a packet interface transmits data bytes from one packet per clock or data cycle on a data bus. Thus, even delineated GFP frames on a data bus require further processing in order to unpack the frames from the data word into packets.

The GFP frame unpacker provides packetized GFP frames to upper-layer protocols. Unpacking logic unpacks the GFP frames into packetized format one at a time from the received data word on the bus. The unpacked GFP frame is attached with SOP and EOP tags. Together, the GFP framer and the GFP unpacker provide GFP frame demapping to upper-layer logic.

As bandwidth demand in a communications system increases, design choices often force the data paths in communications systems to grow increasingly wide. Therefore, an efficient and scalable GFP demapper for wide data bus applications is desirable.

DETAILED DESCRIPTION

Figure 1:
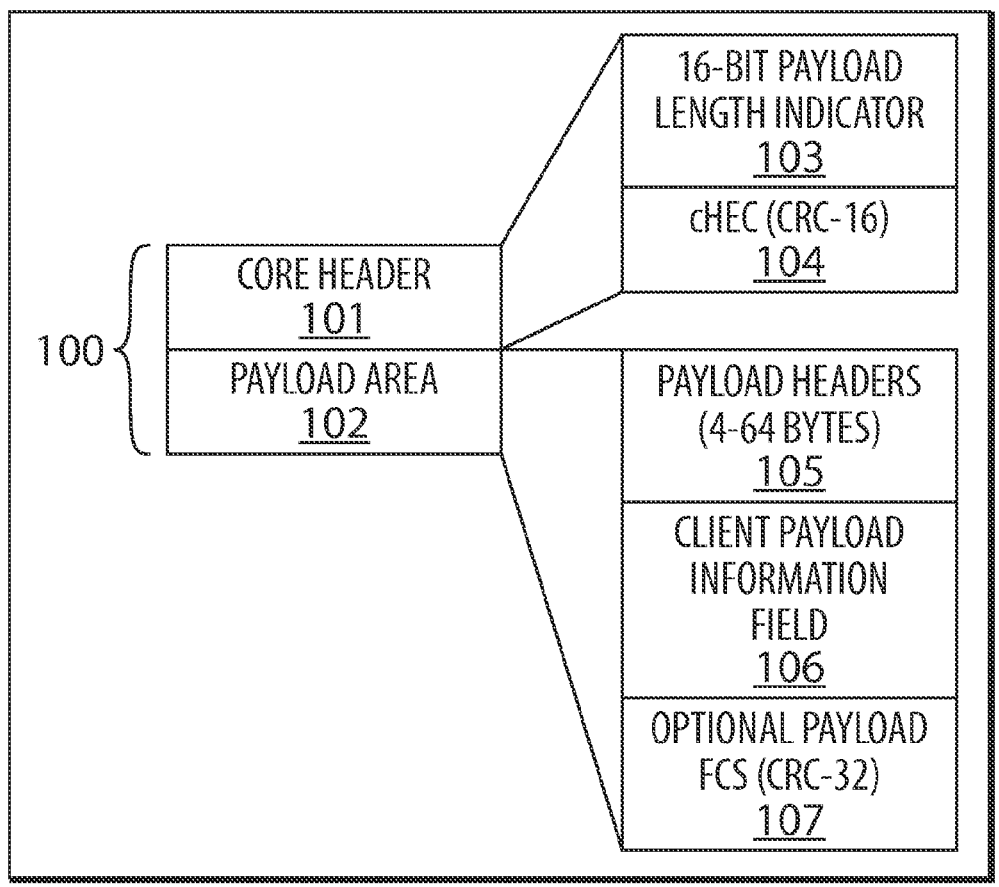
FIG. 1 is a diagram illustrating the general structure of a GFP frame.

The present disclosure provides a system and method of delineating GFP data. The GFP framer comprises a candidate generator for generating an array of core header candidates from a data word received on a data bus, a candidate processor for generating a plurality of candidate tours and a frame delineator for identifying a candidate tour as an active tour and delineating the boundaries of the GFP frames defined by the active tour. Each core header candidate is a reference position of an individual candidate tour and each individual candidate tour of the plurality of candidate tours comprises a record of core header positions for a series of GFP frames from the data word.

The GFP framer of the present disclosure is easily modified to scale to greater bus widths. When the GFP framer is implemented as integrated circuit, the scaling only results in a linear increase in gate count.

In an embodiment, the method of delineating GFP data, comprising: receiving a data word on a data bus; generating an array of core header candidates from the data word; generating a plurality of candidate tours from the array of core header candidates, wherein each core header candidate defines a reference position of one of the plurality of candidate tours, each of the plurality of candidate tours comprising a record of core header positions for a series of GFP frames from the data word; identifying one candidate tour of the plurality of candidate tours as an active tour; and delineating a plurality of boundaries of the series of GFP frames from the data word according to a record of core header positions of the active tour.

In a further embodiment, the method further comprises providing the delineated GFP frames to an interface.

In a further embodiment, the active tour is an active maintenance tour.

In a further embodiment, the method further comprises correcting a single-bit error in a core header of the active maintenance tour.

In a different embodiment, the active tour is an active candidate tour.

In a further embodiment, the method further comprises identifying a single-bit error in a core header of the active candidate tour and discarding the delineated boundaries.

In a further embodiment, the method further comprises selecting a number representing a desired number of consecutive GFP frames and comparing the number to a number of delineated GFP frames.

In a further embodiment, the plurality of boundaries of the series of GFP frames of the entire data word are delineated simultaneously.

In a further embodiment, the data bus receives a plurality of data words in succession and each candidate tour comprises a number of valid core header candidates from at least two successive data words.

In a further embodiment, the bus width is 48 bytes. In a different embodiment, the bus width is 192 bytes.

In another embodiment, the framer comprises: a candidate generator for generating an array of core header candidates from a data word received on a data bus; a candidate processor for generating a plurality of candidate tours from the array of core header candidates, wherein each core header candidate defines a reference position of one of the plurality of candidate tours, each of the plurality of candidate tours comprising a record of core header positions for a series of GFP frames from the data word; and a frame delineator configured for identifying one candidate tour of the plurality of candidate tours as an active tour and delineating a plurality of boundaries of the series of GFP frames from the data word according to a record of core header positions of the active tour.

In a further embodiment, the framer comprises an output to provide the delineated GFP frames to an interface.

In a further embodiment, the frame delineator identifies the candidate tour as an active maintenance tour.

In a further embodiment, the candidate generator corrects a single-bit error in a core header of the active maintenance tour.

In a different embodiment, the frame delineator identifies the candidate tour as an active candidate tour.

In a further embodiment, the candidate processor identifies a single-bit error in a core header of the active candidate tour and the frame delineator discards the delineated boundaries.

In a further embodiment, the framer compares a number of delineated GFP frames to a desired number of consecutive GFP frames.

In a further embodiment, the frame delineator simultaneously delineates the plurality of boundaries of the series of GFP frames of the entire data word.

In a further embodiment, the framer receives a plurality of data words in succession and each candidate tour comprises a number of valid core header candidates from at least two successive data words.

In a further embodiment, the bus width is 48 bytes. In a different embodiment, the bus width is 192 bytes.

In an embodiment, the method of unpacking GFP data comprises the steps of: receiving a frame-delineated data word at a buffer; calculating an expected amount of time required to unpack the frame-delineated data word; providing the frame-delineated data word to an unpacking logic, wherein the providing is configured to coincide with availability of the unpacking logic to receive a data word; and unpacking the frame-delineated data word.

In an embodiment, the GFP data unpacker comprises: a GFP data buffer for receiving a frame-delineated data word; an unpacking latency logic for calculating an unpacking latency defined by an expected amount of time required to unpack the frame-delineated data word; an unpacking latency buffer for storing the calculated unpacking latency; an unpacking logic; a read requestor configured to receive the calculated unpacking latency from the unpacking latency buffer, to request the frame-delineated data word from the GFP data buffer, and to provide the frame-delineated data word to the unpacking logic when the unpacking logic is available to receive data according to the calculated unpacking latency.

The GFP demapper of the present disclosure provides efficient and scalable frame delineation of GFP frames on a wide data bus and provides GFP frame unpacking with minimal read-side latency.

Reference is now made to FIG. 1, which illustrates the general structure of a GFP frame 100. Note that a GFP idle frame has a zero-size payload area 102 and thus solely comprises the core header 101. The core header 101 comprises a 16-bit PLI field 103 and a 16-bit cHEC field 104. The smallest GFP client management frame is an eight-byte frame comprising the four-byte core header 101 plus a four-byte payload header 105. The GFP framer of the present disclosure uses the data in the four-byte core header 101 for performing frame delineation.

Figure 2A:
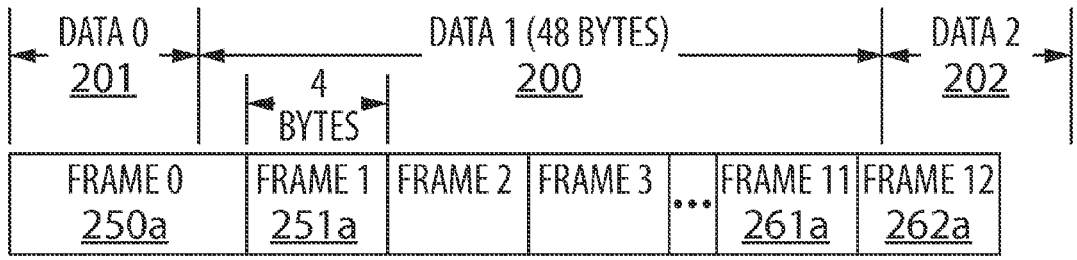
FIG. 2a is a diagram illustrating GFP frames of a first format received on a 48-byte bus.
Figure 2B:
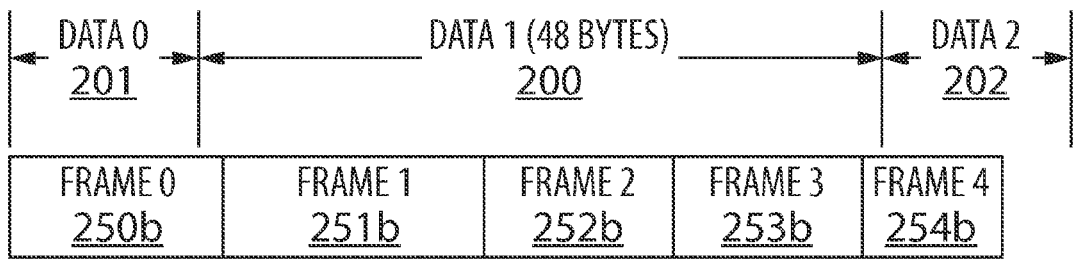
FIG. 2b is a diagram illustrating GFP frames of a second format received on a 48-byte bus.
Figure 2C:
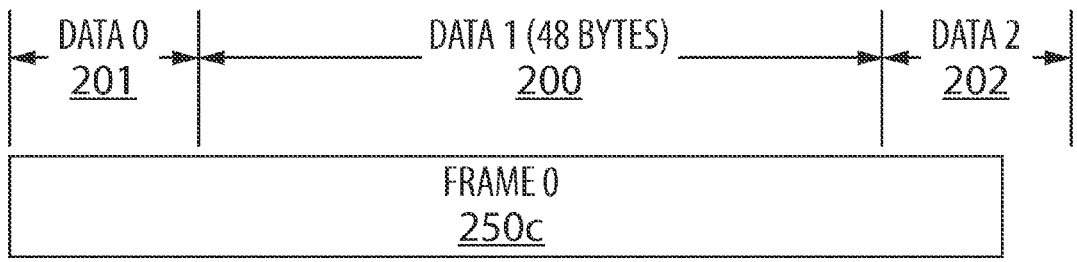
FIG. 2c is a diagram illustrating a partial GFP frame of a third format received on a 48-byte bus.

Reference is now made to FIGS. 2a, 2b, and 2c, which illustrates a data stream received by a GFP framer wherein the framer has a 48-byte wide data bus. FIG. 2a shows a 48-byte data word 200 on the 48-byte data bus, and a portion of the previous data word 201 and a portion of the next data word 202. As shown in FIG. 2a, a portion of the zeroth frame 250a is received in the previous data word 201 and the remaining portion of the zeroth frame 250a is received in the current data word 200. Similarly, a portion of the twelfth frame 262a is received in the current data word 200 and the remaining portion of the twelfth frame 262a is received in the next data word 202. The frames between and including the first frame 251a and the eleventh frame 261a are all received as part of the current data word 200.

In contrast, FIG. 2b shows a portion of the fourth frame 254b is received in the current data word 200 and the remaining portion of the fourth frame 254b is received in the next data word 202. The first frame 251b, the second frame 252b and the third frame 253b are all received as part of the current data word 200.

In another embodiment, FIG. 2c shows a zeroth frame 250c spanning the entire current data word 200 and also occupying portions of the previous and next data words 201 and 202.

FIGS. 2a, 2b, and 2c illustrate a few of the possible GFP frame constructions received on a 48-byte wide data bus. In particular, FIG. 2a further illustrates that all of the frames from the first frame 251a to the eleventh frame 261a are four-byte core header frames. In this scenario, there may be a maximum number of 12 full and partial GFP frame core headers on a 48-byte data bus. Since it is difficult to delineate all of these frames on the bus in a single clock or data cycle, a long sequence of GFP idle frames presents a worst-case scenario for frame delineation.

Figure 3:
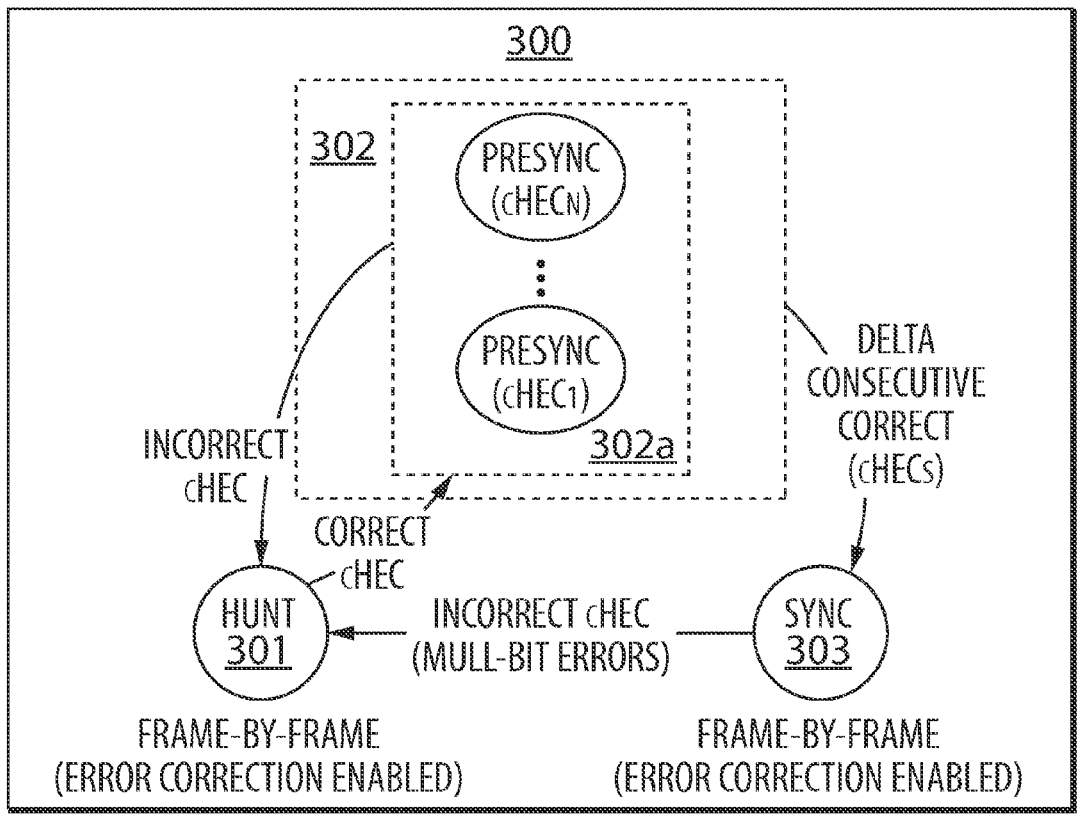
FIG. 3 is a diagram of a GFP framer state machine known in the prior art.

FIG. 3 shows a state machine diagram of the prior art GFP framer. The state machine 300 is a simplified version of the state machine described in GFP standard G.7041, such that the number of "virtual framers M"=1. The HUNT state 301 indicates that the framer possesses no delineation information. That is, the framer has not yet identified any valid core header 101. The PRESYNC state 302 indicates that the framer has identified some delineation information, but not enough to exceed a delineation threshold. The PRESYNC state 302 comprises a number of PRESYNC(n) sub-states 302a that correspond to additional delineation information. Specifically, for each valid core header predicted and confirmed, the framer proceeds to the next PRESYNC(n) sub-state 302a.

Once a threshold number of valid core headers have been predicted and confirmed in continuous order, the framer moves from the PRESYNC state 302 to the SYNC state 303. Thus, the SYNC state 303 indicates that the framer is confident about the frame boundaries it is delineating. If the framer fails to maintain proper frame delineation, it can return to the HUNT state 301 from either of the PRESYNC or the SYNC states, 302 and 303.

Reference will be made to HUNT, PRESYNC and SYNC states in the present disclosure. While the simple state machine of FIG. 3 does not show all of the state machine conditions relevant to the framer of the present disclosure, the HUNT, PRESYNC and SYNC states of the framer of the present disclosure are analogous to the simple state machine.

Figure 4:
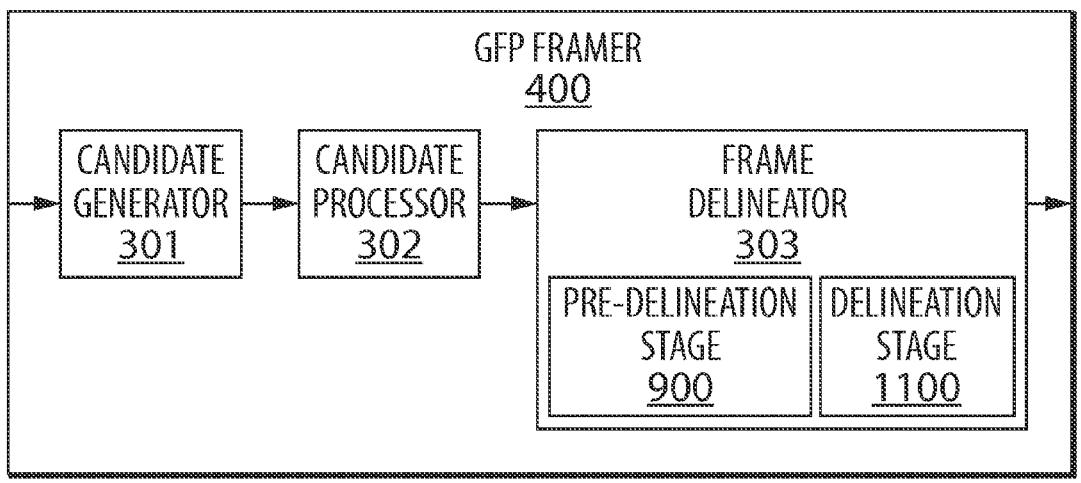
FIG. 4 is a diagram of a GFP framer according to an embodiment of the present disclosure.

Therefore, reference is now made to FIG. 4, which illustrates a GFP framer 400 according to an embodiment of the present disclosure. The framer 400 solves the frame delineation difficulty described in relation to FIG. 2a by preprocessing all of the GFP frames of a data word received on a data bus in a parallel architecture, and then delineating all of the frames of the data word simultaneously once the preprocessing is complete. The GFP framer 400 comprises a candidate generator 401 for generating candidate core headers from data received on the data bus, a candidate processor 402 for generating candidate tours from the candidate core headers and processing the candidate tours into frame delineated data, and a frame delineator 403 for selecting the frame delineated data of a candidate tour. As will be described later in further detail, in an embodiment, the frame delineator 403 comprises a pre-delineation stage 900 and a delineation stage 1100.

The functions of candidate generator 401, the candidate processor 402 and the frame delineator 403 will be described in detail below in accordance with the respective figures.

Figure 5:
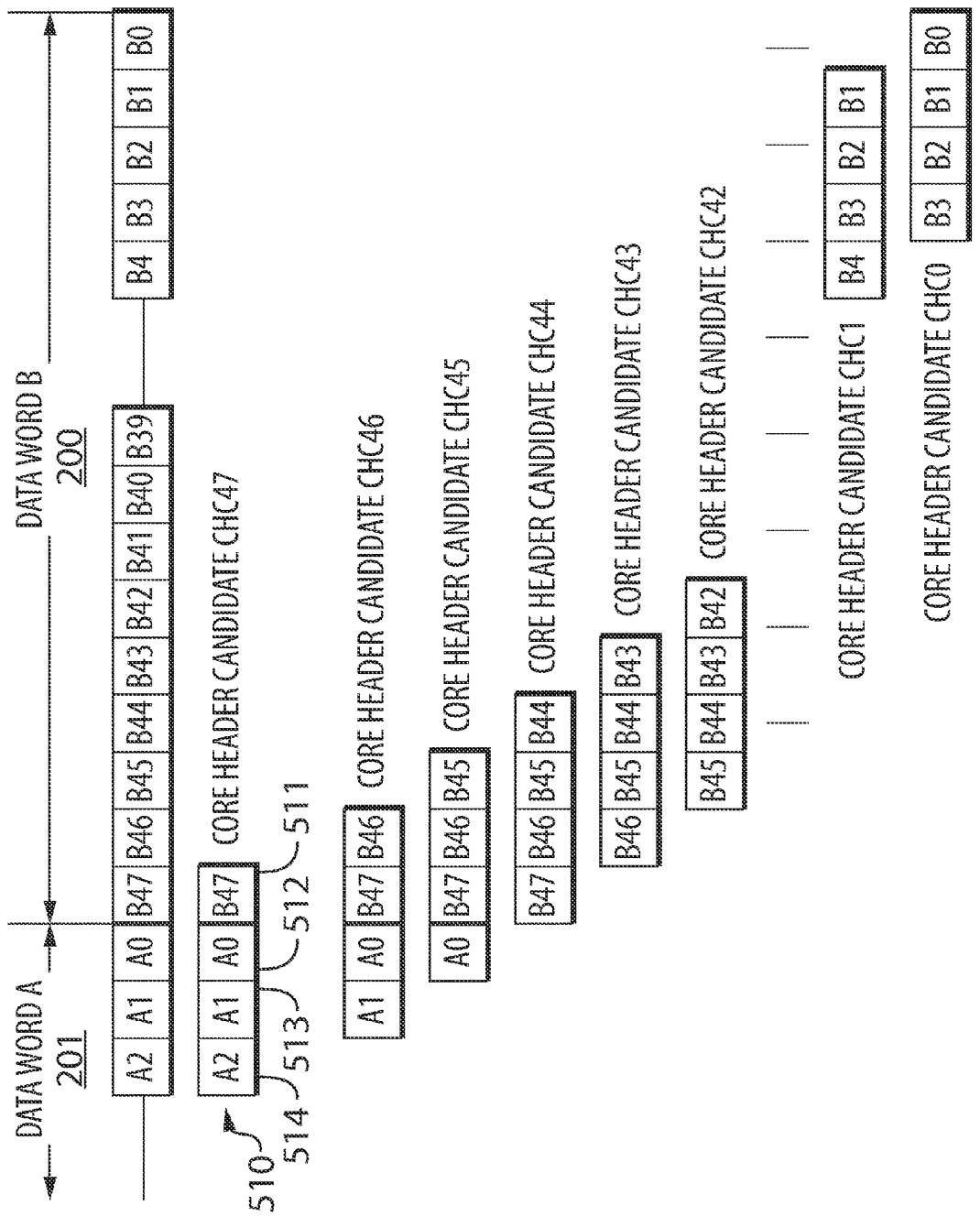
FIG. 5 is a diagram illustrating all of the possible core header candidates in a 48-byte data word, in accordance with an embodiment of the present disclosure.

FIG. 5 illustrates candidate core headers generated by the candidate generator 401 according to an embodiment of the present disclosure. The candidate generator 401 calculates the cHEC of each four-byte core header sequence at every byte position on the 48-byte data word in this embodiment. The calculation generates 48 core header candidates, one for each byte in the data word, as illustrated by the rows of four-byte data sequences.

In the example illustrated in FIG. 5, each core header candidate comprises the one byte at the core header candidate position plus the three most significant bytes directly adjacent to the byte at the core header candidate position. The current data word 200 comprises 48 bytes, each of which is a position for a candidate core header. For example, the first candidate core header 510 has a core header position at the most significant bit of the data word 511. Since a candidate core header is four bytes long, three adjacent bytes are grouped with the byte at the candidate core header position to form the candidate core header. In an embodiment, the four bytes that comprise a first candidate core header are the byte at the first candidate core header position 511, the most significant byte immediately adjacent to the first byte position 512, the next most significant adjacent byte 513, and the next most significant adjacent byte after that 514. Thus in this example, for the first three candidate core headers of the data word, the candidate generator 401 retains data from the three least significant bytes of the previous data word 501.

In the embodiment of FIG. 5, the candidate generator 401 calculates the cHEC value for all 48 possible core header locations, in parallel. For each location, the candidate generator 401 outputs a first perfect cHEC signal 701 if the cHEC value is error free. This speculatively indicates that the calculated byte references the cHEC location of a candidate core header. The candidate generator 401 also generates a first corrected cHEC signal 702 and a first corrected PLI signal 703 if the cHEC value is error free or if the cHEC value contains a single-bit error correction. This generates an array of candidate core headers where each member of the array will either have a first perfect cHEC signal 701 or a first corrected cHEC signal 702. A location with neither a first perfect cHEC signal 701 nor a first corrected cHEC signal 702 is not a candidate core header.

Figure 6:
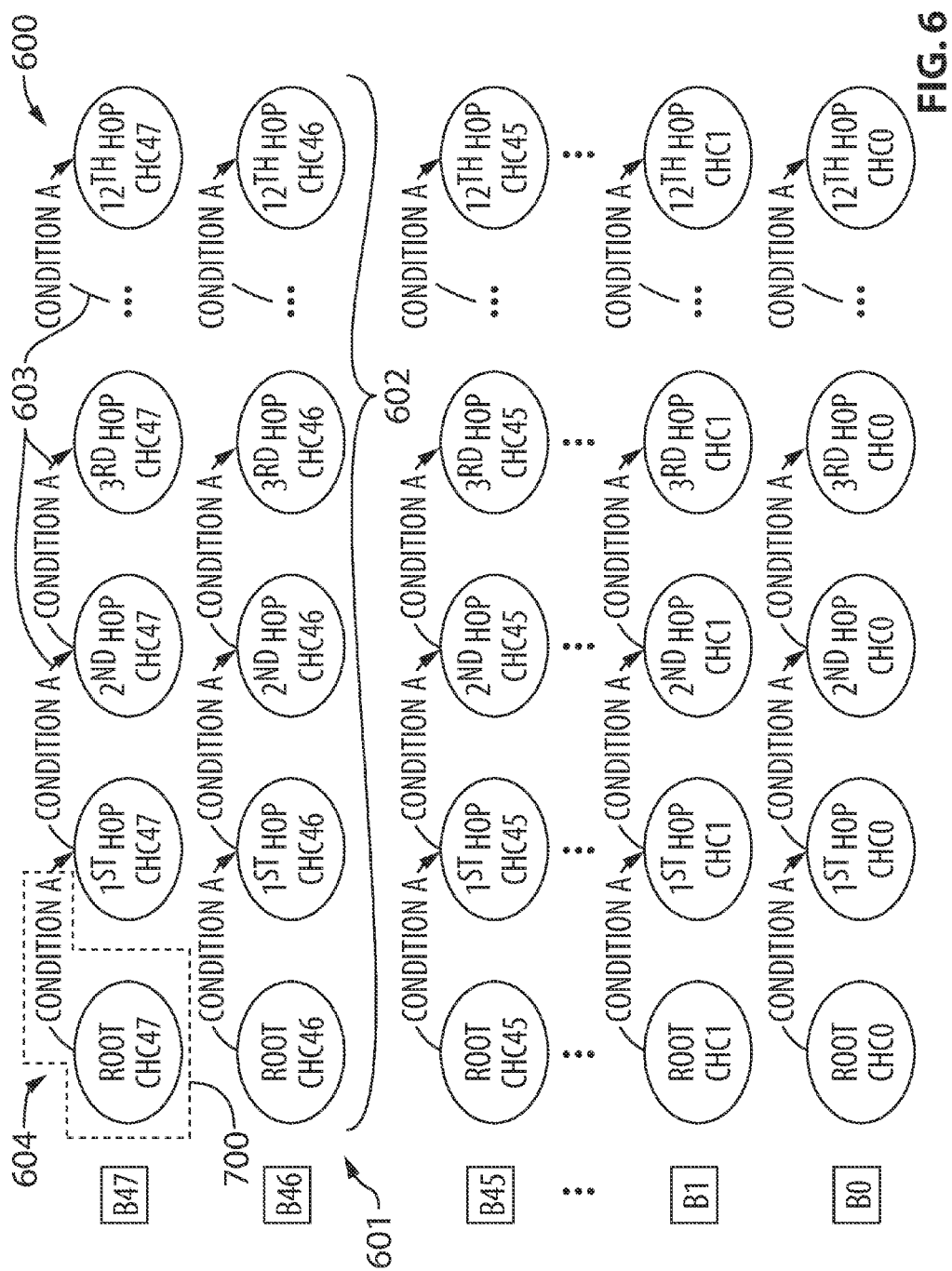
FIG. 6 is a diagram illustrating a matrix comprising rows of candidate tours, in accordance with an embodiment of the present disclosure.

FIG. 6 illustrates a matrix 600 comprising rows of candidate tours, in accordance with an embodiment of the GFP framer 400 according to the present disclosure. The array of core header candidates generated by the candidate generator 401 forms the first column 46504 of a 48×12 matrix (48 rows, 12 columns) 600, as shown in FIG. 5. Each member of the first column 604 is a root core header candidate of a candidate tour, and each row 601 in the matrix defines a candidate tour 602. A candidate tour 602 is a sequence of core header candidates that are related by hops. A hop 603 is a reference from one core header to the next core header as indicated by the PLI. Thus, all of the members of the matrix are core header candidates and the PLI fields of the core headers represent the hops between columns of the matrix 600.

The generation of each candidate tour 602 is accomplished by a series of circuits 700 connected in series. Each circuit 700, described in detail below, takes information from a first core header candidate and calculates and verifies the location of the next referenced core header candidate. Thus, a series of circuits 700 generates the hops and core header candidates that form a candidate tour. Configuring a number of series of circuits 700 in parallel allows the candidate processor 402 to build all of the candidate tours in parallel during the processing prior to delineation.

Figure 7:
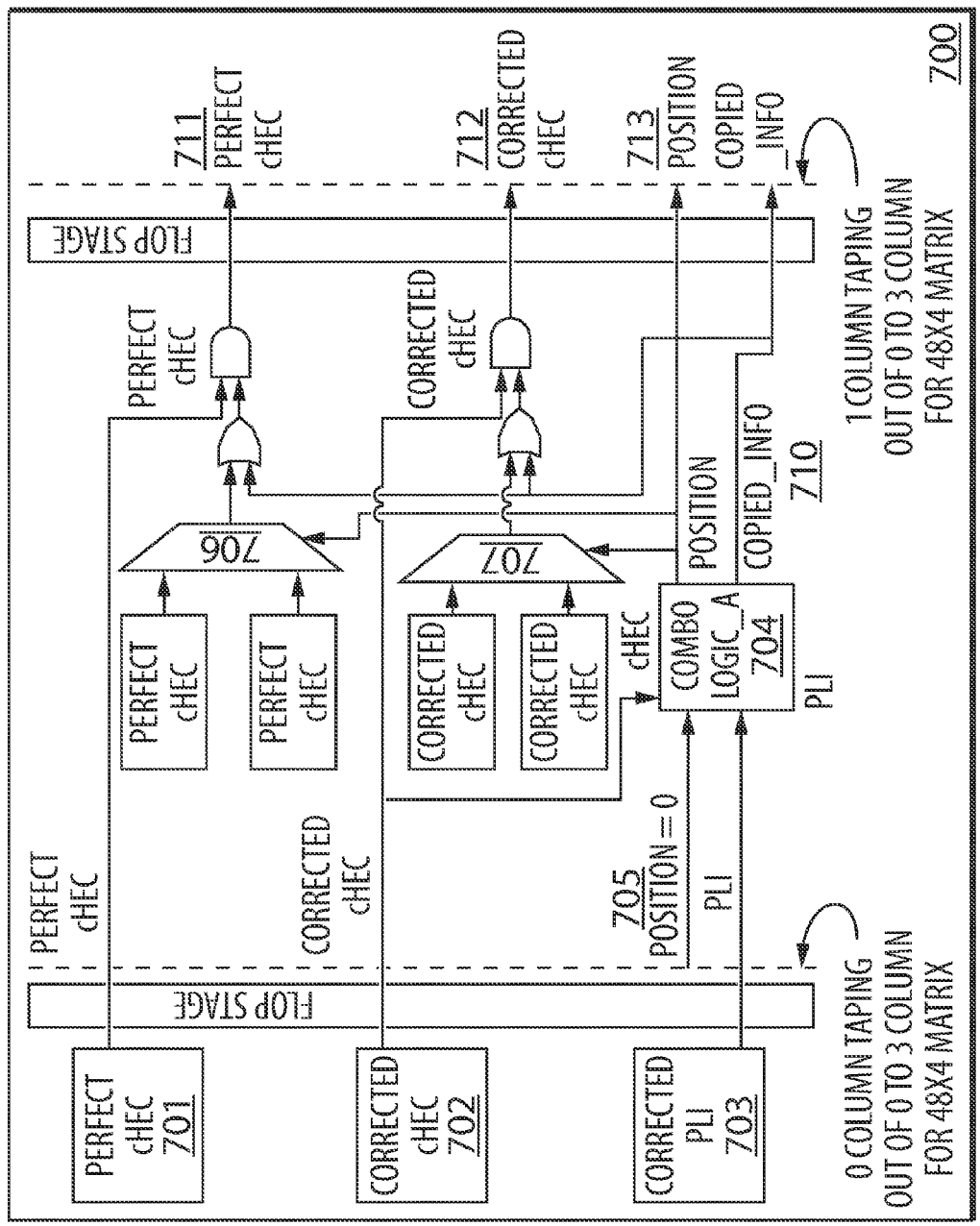
FIG. 7 is a diagram of a candidate processor.

FIG. 7 shows an exemplary implementation of the candidate processor 402. In the figure, a circuit 700 of the candidate processor 402 generates of the first hop of the first candidate tour of the matrix 600. The candidate processor 402 generates second core header candidate signals 611, 612 and 613 from the first core header candidate signals 601, 602 and 603. In an embodiment, the first core header candidate signals 601, 602 and 603 are calculated from the cHEC in the candidate generator 401. The first perfect cHEC signal 701 is asserted true if the root core header candidate is an error free core header. If the cHEC of the root core header candidate is not error free, then the remaining core header candidates in that row have the respective perfect cHEC signal de-asserted. The first perfect cHEC signal 701 for any candidate is true only if there are no errors in the core header candidate. On the other hand, the first corrected cHEC signal 702 for any candidate is true only if the core header candidate is an error free core header or if there was a single bit error correction performed. In the other respects, the first corrected cHEC signal 702 is similar to the first perfect cHEC signal 701 in that a false first corrected cHEC signal 702 for the first hop would de-assert the second corrected cHEC signal 712 and the remaining corrected cHEC signals of a given row of matrix 600.

A candidate tour 602 is characterized by the perfect cHEC and corrected cHEC signals associated with the core header candidates of the candidate tour. If all of the core header candidates of the candidate tour are associated with true perfect cHEC signals, then no error was identified on any of the core header candidate cHEC values. In this case, the GFP framer 400 state machine will not move to the HUNT state 301 from either the PRESYNC state 302 or the SYNC state 303. On the other hand, if at least one single bit error associated with the candidate tour 602 is corrected by the candidate generator 401 during cHEC calculation, a corrected cHEC signal will be asserted true. In this case, the GFP framer 400 state machine will not move to the HUNT state 301 from the SYNC state 303, but will move to the HUNT state 301 from the PRESYNC state 302. According to the present embodiment, the GFP framer 400 will not tolerate a single bit error in the PRESYNC state 302.

As shown in FIG. 6, the next frame's position is provided by the first PLI signal 703 of the core header candidate. The next hop processor 704 receives the current position 705 of the core header candidate in the data word 200 and the first PLI signal 703 of the current core header candidate in order to determine the next frame's position in the current data word 200, or in a subsequent data word (e.g., next data word 202).

If the next hop processor 704 indicates that the next frame starts within the current data word 200, the next frame's position is provided to multiplexers 706 and 707 for selecting the second perfect cHEC 711 signal from the candidate generator 401 and for providing the second perfect cHEC signal 711 to the next circuit 700 for constructing the candidate tour 602. The first perfect cHEC signal 701 value is masked with the second pefect cHEC signal 711 value to de-assert the pefect cHEC signals of remaining hops in candidate tour 602 when a core header candidate with an error is detected. Similarly, the corrected cHEC signals of the candidate tour 602 are masked and de-asserted in the same way.

The second perfect cHEC signal 711 value, the second corrected cHEC signal 712 value, and the position 613 of the next hopped core header are provided to the next circuit 700 in the candidate processor 402. The subsequent circuits 700 in candidate processor 402 are implemented to calculate the respective perfect cHEC signals, corrected cHEC signals and core header positions of the next hops in the candidate tour 602. In subsequent circuits 700, the PLI values of subsequent hops are derived by extracting the corresponding PLI data bits from the data bus pipeline shown in FIG. 4. The replication of the circuit 700 for each hop of each candidate tour populates the matrix 600.

If the first PLI signal 603 indicates that the current frame is large enough to cross the boundary of the current 48 byte word 200, causing the next frame to start in a subsequent data word, then a copy flag 710 is asserted and the current position 705 is copied as the new position 713. First perfect cHEC and first corrected cHEC signal values 601, 602 are also copied to the second perfect cHEC and second correct cHEC signals 711, 712; therefore, when the information a first core header candidate is copied to the next hop because the frame crossed a data word, the copy flag 710 indicates that the perfect cHEC and corrected cHEC signals of subsequent hops in the candidate processor 402 do not represent a true hop of a distinct GFP frame in the candidate tour 602.

In the embodiment of FIG. 7, a frame sum 1002 is also recorded in every row. This field indicates the number of valid frames received in the current candidate tour 602, which can cross multiple data word boundaries and include sums from previous data words. The sum field's value is obtained by observing at which column the copy flag 710 changes from '0' to '1'. This information is necessary for processing the candidate tours in the frame delineator 303, as described below.

Figure 8:
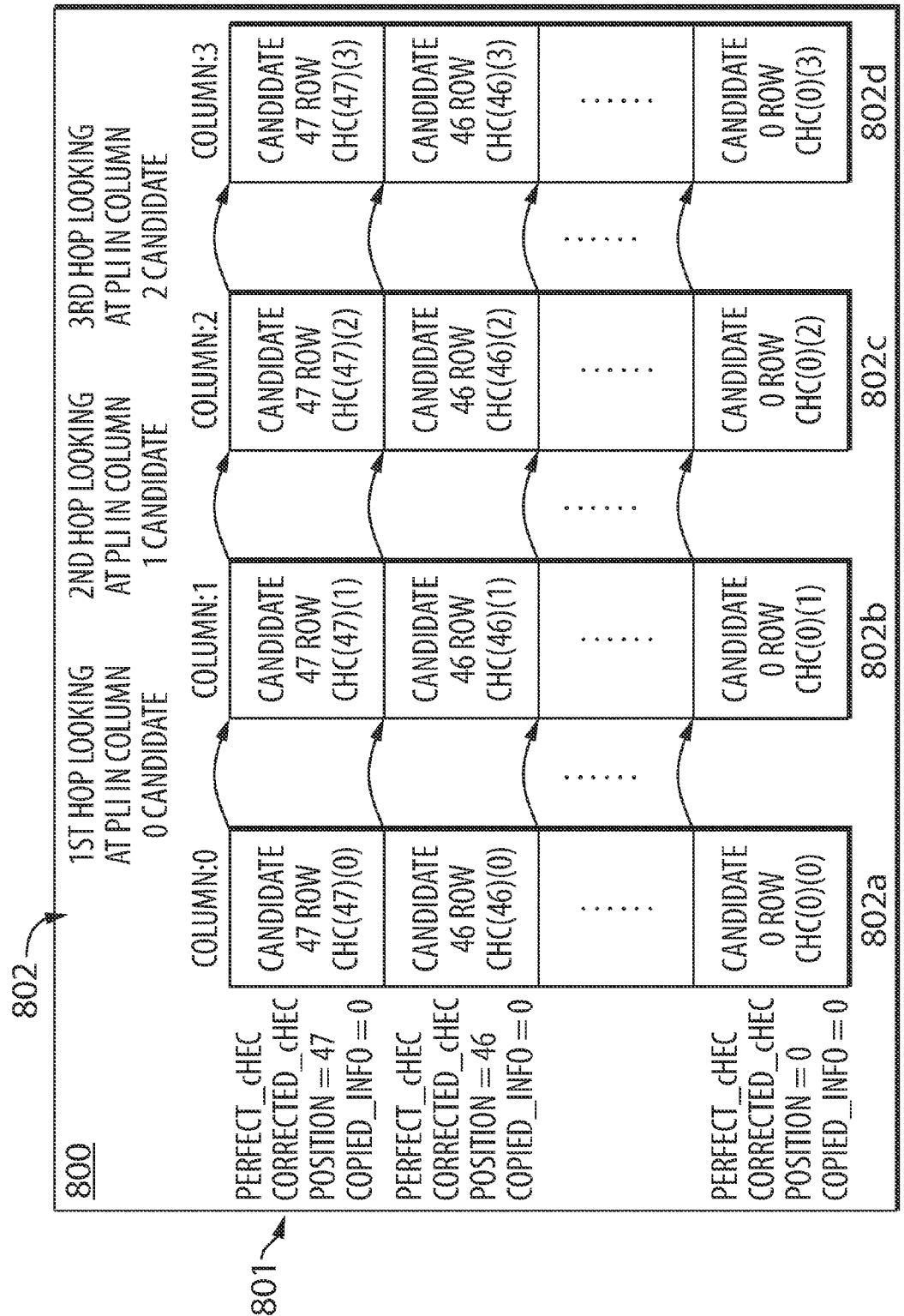
FIG. 8 is a diagram of a database for storing candidate tours.

FIG. 8 shows a database 800 of candidate core headers used for frame delineation. Database 800 comprises 48 rows 801 corresponding to the 48 candidate tours 602 of the present embodiment. The columns 802 of the database 800 functionally correspond to the columns 604 of matrix 600; however, in the present embodiment, database 800 only comprises four columns. The first three columns 802a, 802b and 802c correspond to the first three columns of matrix 600. The fourth column 802d of database 800 corresponds to the twelfth column of matrix 600. Since variable GFP frame sizes can cause the last frame of any given candidate tour 602 in a data word to also be the first frame, or the twelfth frame or any frame in between, the candidate processor 402 copies core header candidate information from one circuit 700 to the next so that the core header candidate information of the last frame of any given candidate tour 602 is always located at the twelfth column of matrix 600. Thus, column 802d also comprises the core header candidate information of the last frame of any given candidate tour 602.

In the embodiment of FIG. 8, the database comprises four columns, representing at least three successive core header candidate hops. As the following figures will show, the column depth of database 800 represents the number of consecutive frames the framer 400 requires for declaring synchronization. Database 800 provides an application-specific flexibility of synchronizing to two or three consecutive valid core headers. In general, an embodiment with a W-byte wide data path will have a W-row database 800 containing W candidate tours. Moreover, an embodiment framer that declares synchronization after V consecutive valid core headers will have a database with V columns.

Since the fourth column 802d of database 800 contains core header candidate information of the last GFP frame of the data word 200, it is possible that delineating with respect to the core header candidate information of column 802d will actually provide delineation of more than four consecutive GFP frames, the framer 400 can only be confident that at least four consecutive GFP frames were received.

Figure 9:
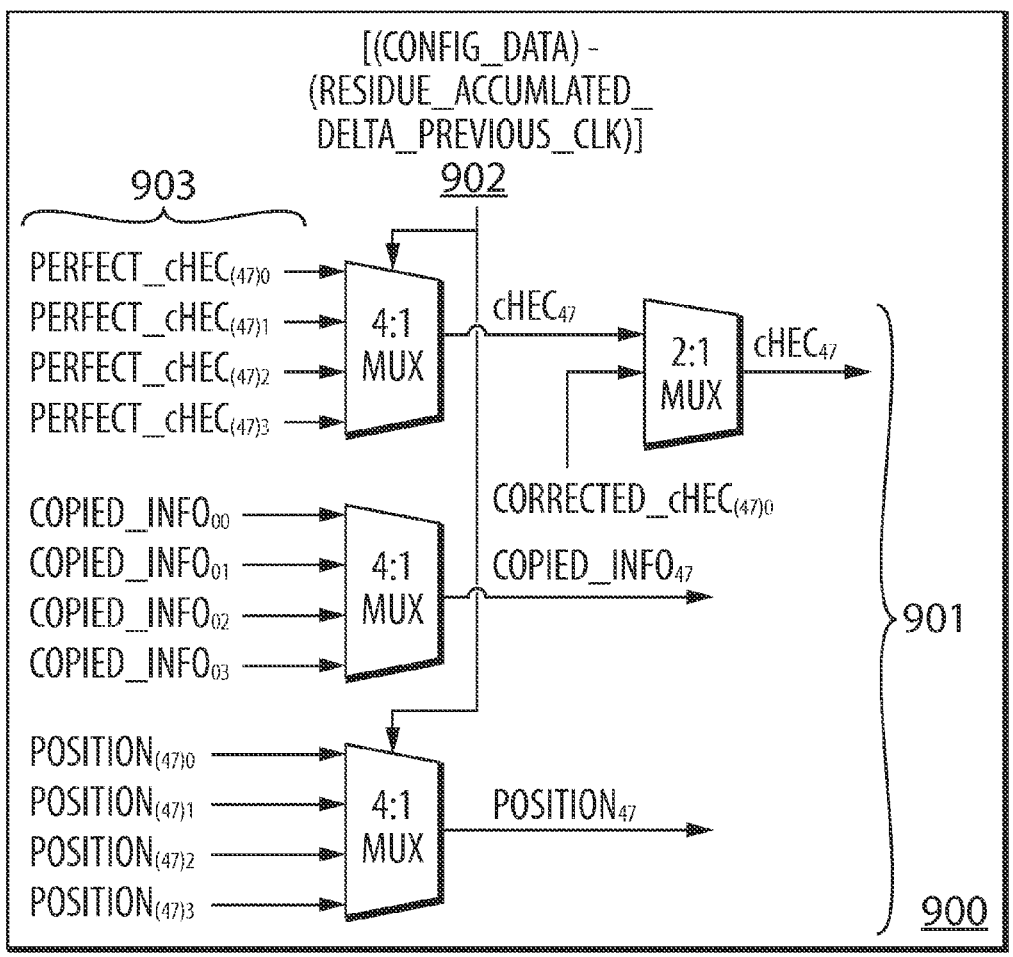
FIG. 9 is a diagram of a pre-delineation stage.

Reference is now made to FIG. 9, which illustrates an exemplary implementation of a pre-delineation stage 900 of the frame delineator 403. The pre-delineation stage 900 comprises two stages of cascaded multiplexers. In the first stage, a selection signal 702 determines the core header information 903 from one of the columns 802a, 802b, 802c and 802d of the database 800 which is provided to the delineation stage 1100. The selection signal 902 is a value equal to the difference between a number of desired consecutive core header candidates and a number of consecutive core header candidates received in previous data words.

In the case of large GFP frames, it may require a number of successive data words to receive the desired number of consecutive GFP frames necessary for the framer to confidently declare frame delineation and move to the SYNC state 303. For example, assume that framer 400 requires four consecutive GFP frames for synchronization and Data Word #1 and Data Word #2 each contain two frames. The framer 400 will not declare synchronization at Data Word #1, but at Data Word #2, the framer 400 will declare synchronization because the selection signal 702 considers GFP frames received from previous data words.

The second multiplexer stage receives an input indicating whether the framer 400 is in the SYNC state 303 or is in either of the HUNT and PRESYNC states 301 and 302. If the framer 400 is already in the SYNC state 303, the pre-delineation stage 900 provides the first corrected cHEC signal 702 to the delineation stage. This allows framer 400 to maintain synchronization despite corrected single bit core header errors.

On the other hand, if framer 400 is in the HUNT or PRESYNC state 301, 302, then the second stage multiplexer causes pre-delineation stage 900 to provide a perfect cHEC signal from one of the columns 802 of database 800 to delineation stage 1100 of frame delineator 403. In this case, corrected single bit errors in the core header are not permitted and the identification of a de-asserted perfect cHEC signal will cause framer 400 to remain in HUNT state 301 or move to HUNT state 301 from PRESYNC state 302.

The pre-delineation stage 900 circuit is replicated for each candidate tour. Thus, the pre-delineation stage 900 of frame delineator 403 generates delineation core header information 901 for each candidate tour.

Figure 10:
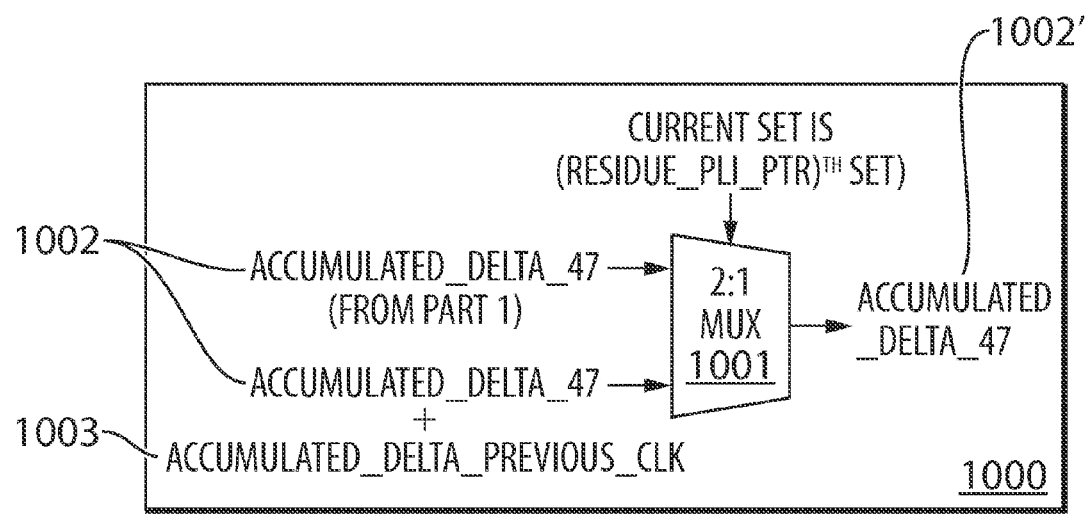
FIG. 10 is a diagram of a circuit for determining the frame sum of a candidate tour.

FIG. 10 shows a circuit 1000 for updating the frame sum 1002 of a given row of database 800. The select input of multiplexer 1001 is a signal in the frame delineator 403 indicating whether the start of a GFP frame is expected in the current data word 200. If a frame is expected to start, then the updated frame sum 1002' is the frame sum of the current data word 1002 increased by the frame sum of previous data words 1003.

Figure 11:
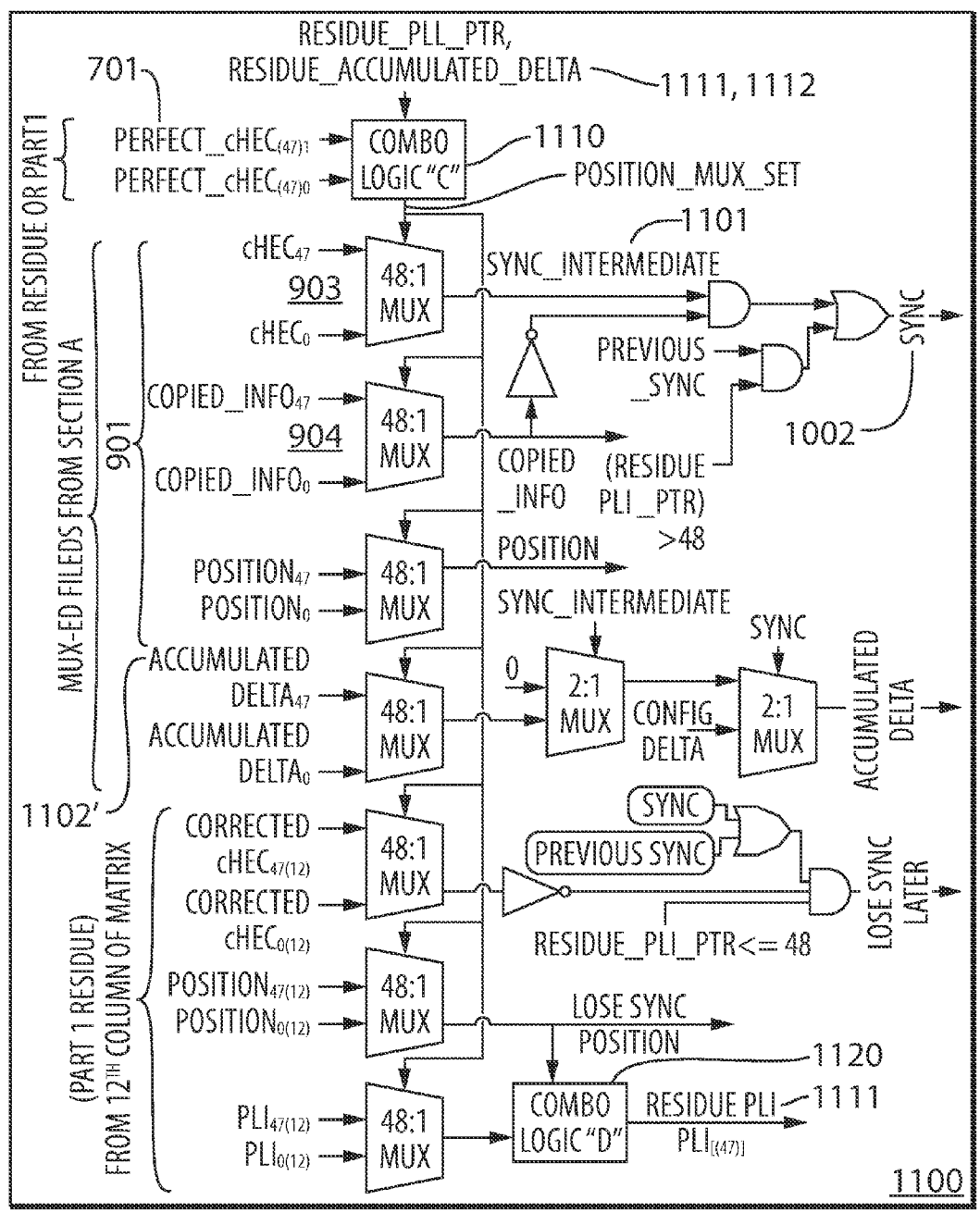
FIG. 11 is a diagram of a delineation stage.

FIG. 11 shows an exemplary implementation of delineation stage 1100 of the frame delineator 403. The delineator stage 1100 uses information from the 48 replicated pre-delineation stage 900 circuits for setting an active tour, which can be an active candidate tour or an active maintenance tour. An active candidate tour is a selected candidate tour 602 that the framer 400 exclusively follows when the framer 400 is in the PRESYNC state 302. An active maintenance tour is a selected candidate tour 602 that the framer 400 exclusively follows when the framer 400 is in the SYNC state 303.

The delineation stage 1100 of the frame delineator 403 traverses across the tap points selected in the pre-delineation stage 900 to determine whether the framer 400 can enter the SYNC state 303 during the current data word 200. It also predicts whether, after gaining synchronization, the framer 400 will be losing synchronization later in the same data word 200—that is whether the data word 200 contains any invalid core headers. The delineation stage 1100 indicates when the framer 400 is in the SYNC state 303, according to the sync flag 1102, or when the framer 400 is in the PRESYNC state 302, according to the presync flag 1101. Delineation stage 1100 also records whether there is a carried forward frame (i.e. exceeding the current data transfer size of 48 bytes), and predicts a next frame position 1111 in the subsequent data word 202.

Delineation stage 1100 comprises an active tour selector 1110. The inputs of active tour selector 1110 comprise the active tour frame sum 1112 and next frame position 1111. If the active tour frame sum 1112 indicates that there were no valid core headers in previous data words active tour selector 1110 deduces that the framer is in the HUNT state 301 and proceeds to select a candidate tour as either an active candidate tour or an active maintenance tour.

When the framer 400 is in the HUNT state 301, the active tour selector 1110 inputs also comprise each of the 48 first perfect cHEC signals 701 for each byte-location of the data word 200. The active tour selector 1110 selects the location of the first true first perfect cHEC signal 701, which represents the first candidate tour 602 of data word 200. This candidate tour 602 becomes an active candidate tour or an active maintenance tour.

The active tour selector 1110 provides the first cHEC byte position of the selected candidate tour to the select line of the candidate tour multiplexers 1115 of delineation stage 1100. By examining the outputs of the pre-delineation stage 900, the delineation stage 1100 determines whether the framer 400 received the required number of consecutive GFP frame core headers in the current data word 200. If the determination is positive, the sync flag 1102 is set and the framer 400 enters the SYNC state 303. In this case, the candidate tour 602 becomes an active maintenance tour defined by the next frame position 1111 value. In subsequent data words, the candidate generator 401 and candidate processor 402 perform the same operations on the subsequent data words; however, the pre-delineation stage 900 provides the first corrected cHEC signal to the delineation stage 1100 and the active tour selector 1110 selects the multiplexer inputs of the core header at the position indicated by the next frame position 1111 value.

If the determination is negative, but the no core header errors were identified in data word 200, the presync flag 1101 is set and framer 400 enters the PRESYNC state 302. In this case, the candidate tour 602 becomes an active candidate tour defined by the next frame position 1111 value. In subsequent data words, the candidate generator 401 and candidate processor 402 perform the same operations on the subsequent data words; however, the pre-delineation stage 900 provides the perfect cHEC signal of a specified column 802 of database 800 to the delineation stage 1100 and the active tour selector 1110 selects the multiplexer inputs of the core header at the position indicated by the next frame position 1111 value.

The next frame position 1111 value is calculated at the next frame position calculator 1120. The next frame position calculator 1120 receives the position of the last frame in the current data word 200 and the reference PLI of the last frame. Based on these inputs, the next frame position calculator 1120 determines the position of the next expected core header cHEC in the next data word. Based on the next frame position 1111, the delineation stage 1100 can follow an active candidate tour or an active maintenance tour from one data word to the next data word.

The candidate generator 401, the candidate processor 402, and the frame delineator 403 described above are very scalable and can be implemented in circuits with bus widths greater than 48 bytes. The frame delineation blocks shown in FIG. 5 to FIG. 11 can be easily replicated in order to scale to greater bus widths. This only results in a linear increase in gate count.

Figure 12:
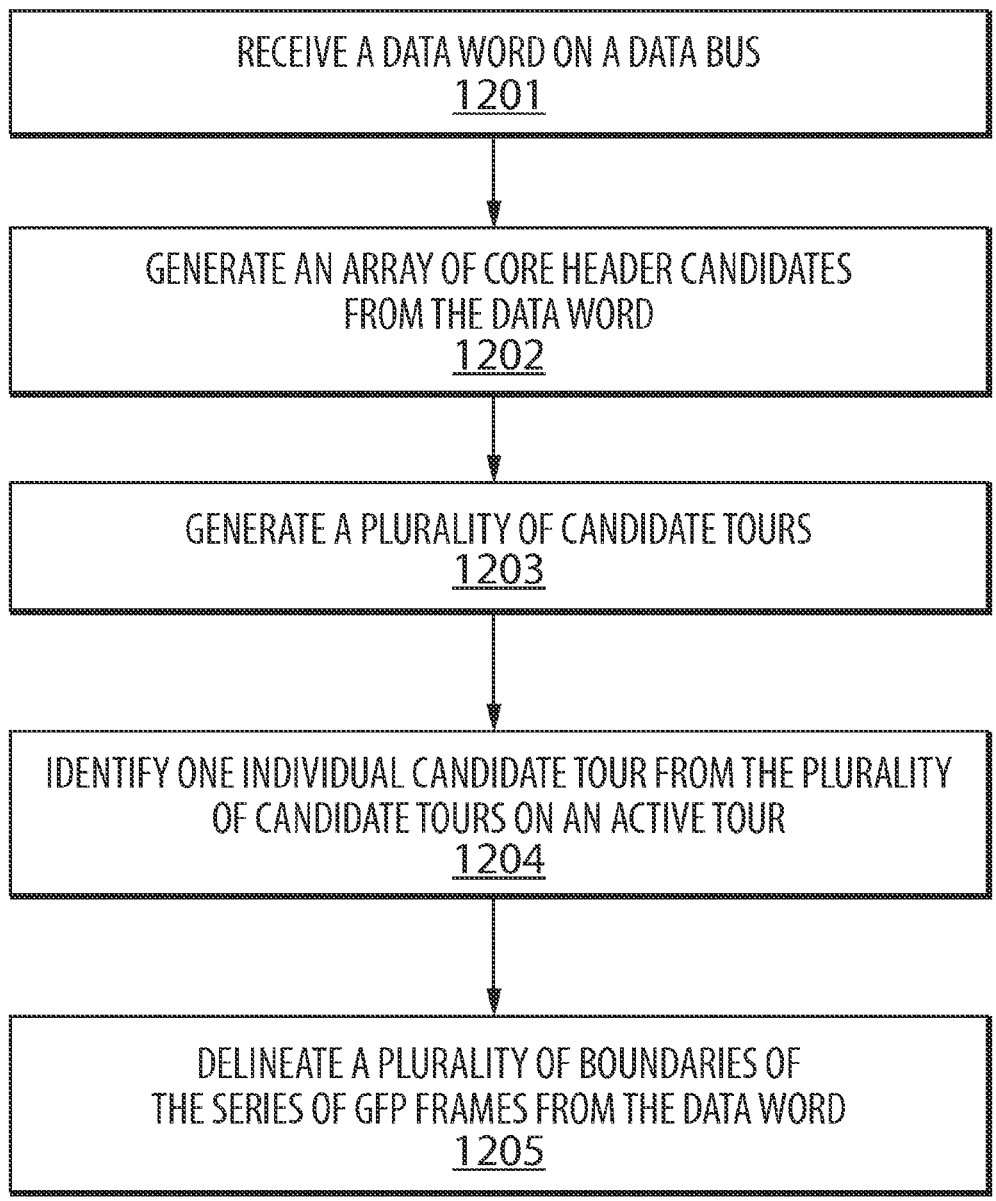
FIG. 12 is a flow chart illustrating a method of frame delineation in accordance with an embodiment of the present disclosure.

Reference is now made to FIG. 12, which is a flow chart illustrating a method of frame delineation according to an embodiment of the present disclosure. At 1201, the framer 400 receives a data word on a data bus. At 1202, the candidate generator 401 generates an array of core header candidates. At 1203, the candidate processor 402 generates a plurality of candidate tours from the array of core header candidates. Each core header candidate is a reference position of an individual candidate tour and each individual candidate tour of the plurality of candidate tours comprises a record of core header positions for a series of GFP frames from the data word. At step 1204, the frame delineator 403 identifies one individual candidate tour of the plurality of candidate tours as an active tour. At 1205, the frame delineator 403 delineating a plurality of boundaries of the series of GFP frames from the data word according to a record of core header positions of the active tour.

Figure 13:
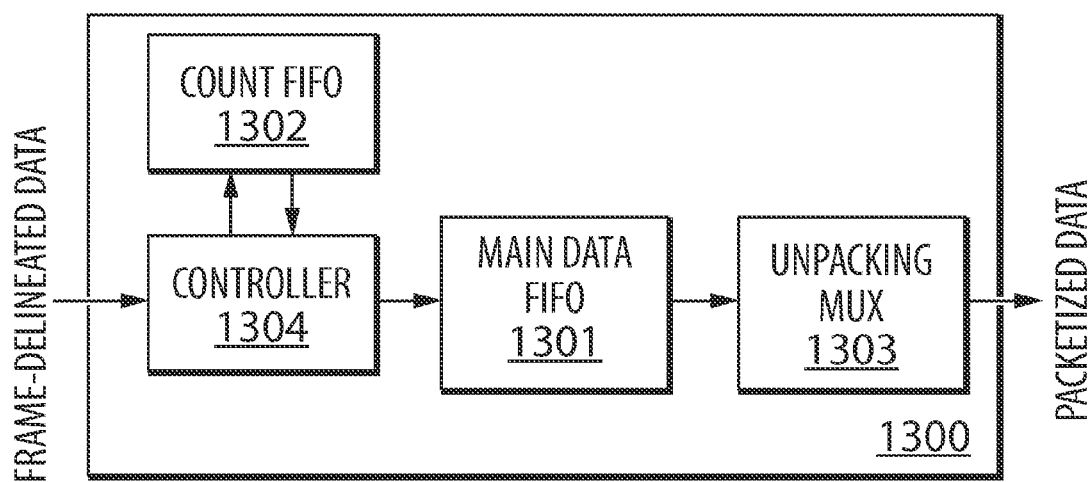
FIG. 13 is a diagram illustrating an implementation of the GFP frame unpacker according to an embodiment of the present disclosure.
Figure 14:
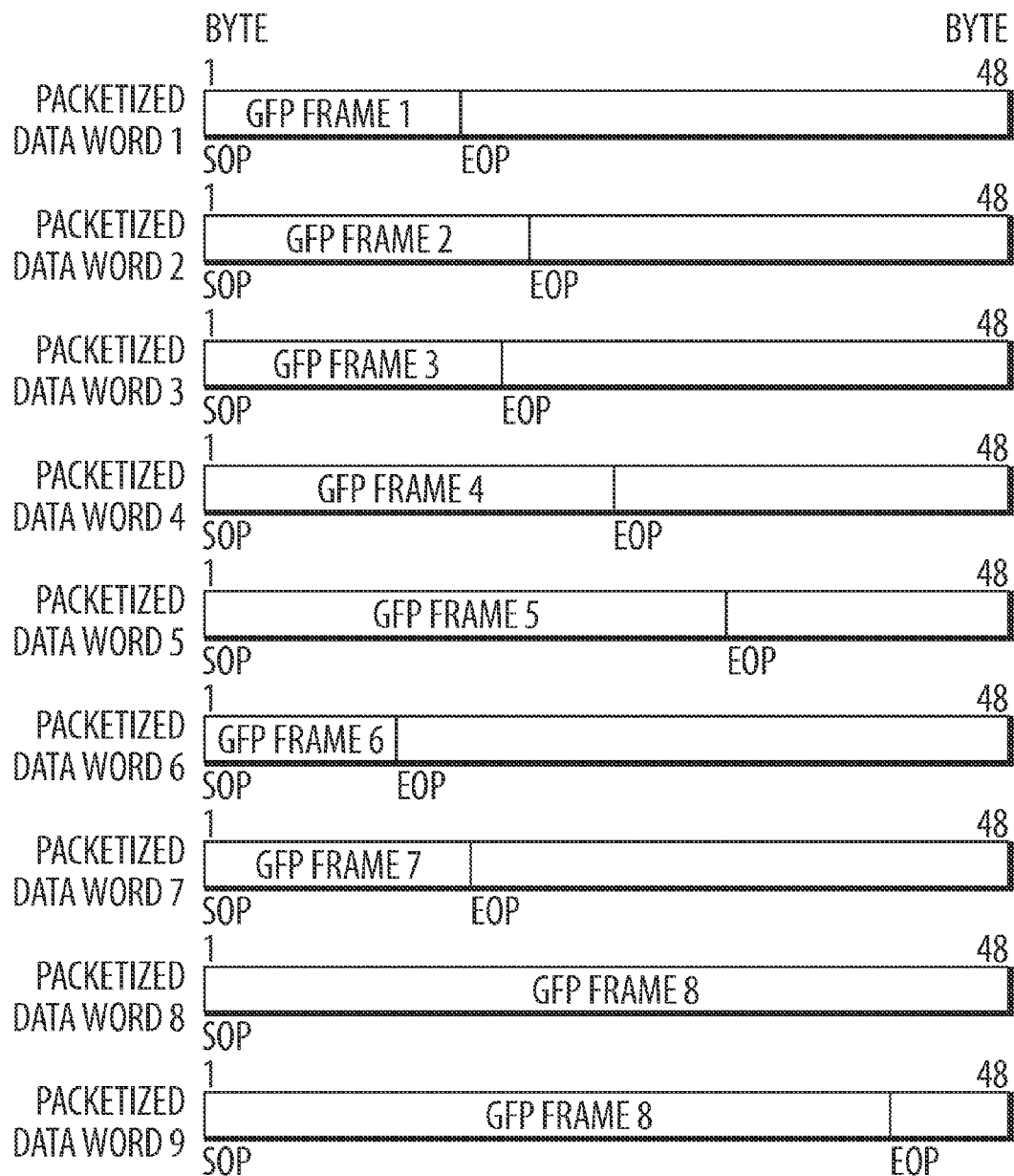
FIG. 14 is a diagram illustrating unpacked GFP frames transmitted individually over a 48-byte wide data bus, in accordance with an embodiment of the present disclosure.

Reference is now made to FIG. 13, which is an implementation of the GFP frame unpacker 1300 according to an embodiment of the present disclosure. The GFP frame unpacker 1300 deletes GFP idle frames since GFP idle frames are only used for frame delineation and are not packetized for transmission to upper-layer protocols. Therefore, the minimum possible frame length is eight bytes and there is a maximum number of six whole and partial GFP frames on one data word. The GFP unpacker 1300 appends start of packet (SOP) and end of packet (EOP) tags to the delineated GFP frames and unpacks the GFP frames from the data word by transmitting the frames individually over the 48-byte wide bus, as shown in FIG. 14.

Since a packed GFP data word may be unpacked into multiple GFP frames, for every data word written to the GFP frame unpacker 1300, more than one read cycle may be required. To achieve this, the clock frequency at the read side is increased to 500 MHz, compared to 300 MHz at write side. The appended SOP and EOP tags further reduce the read-side bandwidth. Thus, despite the increased read-side clock frequency, the FIFO has the potential to encounter an overflow state, requiring the GFP frame unpacker 1300 logic to drop certain frames.

The GFP frame unpacker writes a frame delineated GFP data word to a Main Data FIFO memory 1301, calculates a count field for this GFP frame and writes the count value to a Count FIFO memory 1302. The count value represents the number of expected processing cycles required in the read domain to unpack the data word and the count value is based on the frame boundaries in the data word.

The GFP frame unpacker also maintains an accumulated count field for every channel. Whenever the accumulated count value for any scheduled channel is below the read pipeline delay, a read is request is sent to the Main Data FIFO 1301. This read request causes the data word and associated count pair to be popped from the Main Data FIFO 1301 and the Count FIFO 1302 and to enter the read domain for unpacking. When this happens, the count field is added to this accumulated count field. Whenever a GFP frame is unpacked the accumulated count field is subtracted by one processing cycle.

The read request to pop the data from the FIFO is timed to account for the unpacking delay of the previous data word. Therefore, according to this method, whenever the GFP frame unpacker 1300 is available to unpack a data word, it will receive data read from the FIFO 1301. Consequently, the correct timing ensures that the unpacking mux 1303 does not receive extra data that it is unable to unpack and that there is no waiting period for the unpacking mux 1303 to receive data from the FIFO 1301.

Because every packetized GFP frame requires one processing cycle to unpack, a data word comprising many smaller GFP frames will correspond to a greater expected processing time. Therefore, when the FIFO approaches overflow, the FIFO controller 1304 will prioritize dropping smaller GFP frames.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a hardware product implemented in an Integrated Circuit (IC), Programmable Gate Array, or some combination of Integrated Circuit(s), Programmable Gate Array(s), and Software. Those of ordinary skill in the art will appreciate that other functions can also be implemented on such Integrated Circuits or Programmable Gate Arrays.

The above-described embodiments are intended to be examples only. Alterations, modifications and variations can be effected to the particular embodiments by those of skill in the art without departing from the scope, which is defined solely by the claims appended hereto.

What is claimed is:

1. A method of packetizing Generic Framing Procedure (GFP) data, comprising:
   receiving a data word on a data bus, the data word comprising at least one byte-aligned GFP frame or a portion of a byte-aligned GFP frame;
   generating an array of core header candidates from the data word, each core header candidate being offset by an integer number of bytes in the data word;
   generating a plurality of candidate tours from the array of core header candidates, each candidate tour comprising a different core header candidate from the array of core header candidates, the core header candidate defining a reference position and pointing to a next core header candidate;
   storing the plurality of candidate tours in a database comprising entries for the core header candidates and next core header candidates of each candidate tour;
   selecting an active tour from the plurality of candidate tours stored in the database;
   delineating the data word if the active tour stored in the database comprises at least a threshold number of valid core header candidates, wherein delineating comprises determining the frame boundary of the GFP frame or the portion of the GFP frame from the data word according to the valid core header candidates of the active tour stored in the database;

packetizing the GFP frame or the portion of the GFP frame by appending a start of packet tag adjacent to the most significant bit of the frame boundary and appending an end of packet tag adjacent to the least significant bit of the frame boundary; and outputting the GFP frame packet on the data bus.

2. The method of claim 1, wherein the active tour is an active maintenance tour.

3. The method of claim 2, further comprising correcting a single-bit error in a core header of the active maintenance tour.

4. The method of claim 1, wherein the active tour is an active candidate tour.

5. The method of claim 4, further comprising identifying a single-bit error in a core header of the active candidate tour and discarding the delineated boundaries.

6. The method of claim 4, further comprising selecting a number representing a desired number of consecutive GFP frames and comparing the number to a number of delineated GFP frames.

7. The method of claim 1, wherein delineating further comprises simultaneously determining the frame boundary of a second GFP frame or a portion of the second GFP frame from the data word according to the valid core header candidates of the active tour stored in the database.

8. The method of claim 7, further comprising the steps of:
calculating an expected amount of time required to packetize the GFP frame or the portion of the GFP frame;
calculating an expected amount of time required to packetize the second GFP frame or the portion of the second GFP frame; and
packetizing the second GFP frame or the portion of the second GFP frame, rather than the GFP frame or the portion of the GFP frame, if the expected amount of time to packetize the GFP frame or the portion of the GFP frame is greater than the expected amount of time to packetize the second GFP frame or the portion of the second GFP frame.

9. The method of claim 1, wherein the data bus receives a plurality of data words in succession and each candidate tour comprises a number of valid core header candidates from at least two successive data words.

10. The method of claim 1, wherein the bus width is 48 bytes.

11. The method of claim 1, wherein the bus width is 192 bytes.

12. A Generic Framing Procedure (GFP) data frame processor comprising:
a candidate generator for generating an array of core header candidates from a data word received on a data bus, each core header candidate being offset by an integer number of bytes in the data word, and the data word comprising at least one byte-aligned GFP frame or a portion of a byte-aligned GFP frame;
a candidate processor for generating a plurality of candidate tours from the array of core header candidates, each candidate tour comprising a different core header candidate from the array of core header candidates, the core header candidate defining a reference position and pointing to a next core header candidate;
a database for storing the plurality of candidate tours, the database comprising entries for the core header candidates and next core header candidates of each candidate tour;
a frame delineator configured to:
select an active tour from the plurality of candidate tours stored in the database, and
delineate the data word if the active tour stored in the database comprises at least a threshold number of valid core header candidates, wherein delineating comprises determining the frame boundary of the GFP frame or the portion of the GFP frame from the data word according to the valid core header candidates of the active tour stored in the database; and
an unpacker configured to:
packetize the GFP frame or the portion of the GFP frame by appending a start of packet tag adjacent to the most significant bit of the frame boundary and appending an end of packet tag adjacent to the least significant bit of the frame boundary, and
output the GFP frame packet on the data bus.

13. The processor of claim 12, wherein the frame delineator selects an active maintenance tour from the plurality of candidate tours stored in the database.

14. The processor of claim 13, wherein the candidate generator corrects a single-bit error in a core header of the active maintenance tour.

15. The processor of claim 12, wherein the frame delineator selects an active candidate tour from the plurality of candidate tours stored in the database.

16. The processor of claim 15, wherein the candidate processor identifies a single-bit error in a core header of the active candidate tour and the frame delineator discards the delineated boundaries.

17. The processor of claim 15, wherein the framer compares a number of delineated GFP frames to a desired number of consecutive GFP frames.

18. The processor of claim 12, wherein the frame delineator simultaneously determines the frame boundary of a second GFP frame or a portion of the second GFP frame from the data word according to the valid core header candidates of the active tour stored in the database.

19. The processor of claim 18, wherein the unpacker is further configured to:
calculate an expected amount of time required to packetize the GFP frame or the portion of the GFP frame;
calculate an expected amount of time required to packetize the second GFP frame or the portion of the second GFP frame; and
packetize the second GFP frame or the portion of the second GFP frame, rather than the GFP frame or the portion of the GFP frame, if the expected amount of time to packetize the GFP frame or the portion of the GFP frame is greater than the expected amount of time to packetize the second GFP frame or the portion of the second GFP frame.

20. The processor of claim 12, wherein the framer receives a plurality of data words in succession and each candidate tour comprises a number of valid core header candidates from at least two successive data words.

21. The processor of claim 12, wherein the bus width is 48 bytes.

22. The processor of claim 12, wherein the bus width is 192 bytes.

* * * * *